July 21, 1936.　　　R. E. LEAVENS　　　2,048,012

BANANA PEELER

Filed May 15, 1934

Inventor

Robert E. Leavens.

By Hardway & Cathey

Attorney

UNITED STATES PATENT OFFICE 2,048,012

BANANA PEELER

Robert E. Leavens, Houston, Tex.

Application May 15, 1934, Serial No. 725,738

3 Claims. (Cl. 146—5)

This invention relates to a banana peeler.

An object of the invention is to provide an implement specially designed for use in removing the peeling from fruit such as bananas.

An object of the invention is to provide an implement specially designed for use in removing the peeling from bananas and similar fruits and by the use of which the peeling may be stripped from the fruit without touching the peeled fruit.

Another object of the invention is to provide a peeler of this type embodying a body having a chute for the peeled fruit, a blade for slitting the peeling at one end of the fruit and guides for stripping the peeling from the fruit as the fruit is advanced, by hand, through the chute.

Another object of the invention is to provide an implement of this character having a body formed of confronting sections held yieldingly together so that the sections will readily yield to enlarge the chute and to permit the passage of fruit of different sizes. A further feature resides in the provision of an implement of the character described which may be readily assembled for use and readily dismembered for cleansing.

With the above and other objects in view the invention has particular relation to certain novel features of construction arrangement of parts and use, an example of which is given in this specification and illustrated in the accompanying drawing, wherein.

Figure 1:
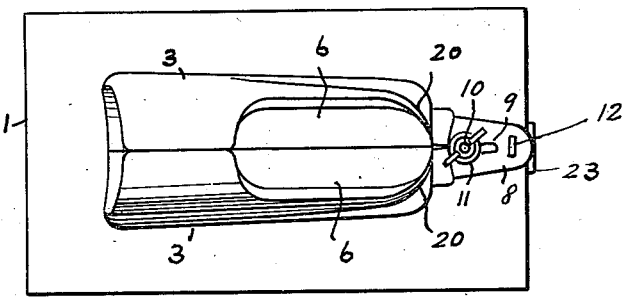
Figure 1 shows a plan view of the peeler.

In the drawing the numeral 1 designates a suitable base having a countersunk seat 2 in the upper face thereof to receive the lower ends of the mating sections 3, 3 of the body. These sections are substantially similar in shape and are complemental. One end of the countersunk portion 2 is undercut as at 4 and the adjacent margin of the lower end of the body is correspondingly shaped to fit into the undercut portion 4.

The adjacent sides of the sections 3 are correspondingly grooved forming the grooves 6, 6 which match or coincide to form a chute through the body leading from the upper end thereof downwardly and rearwardly. The forward side of the body has the transverse slot 7 entirely across the same and an inwardly widened clutch plate 8 is fitted into this slot. This plate is flexible and serves to hold the body seated in the seat 2 as well as to hold the sections of the body yieldingly together but to permit the upper ends of said sections to be spread apart. The plate 8 has the lengthwise slot 9 therein and secured to the base 1 and extending through said slot there is the set bolt 10 whose upper end is threaded to receive the wing nut 11, which may be screwed down against the plate 8 to secure the same in place. The outer end of the plate 8 has a grip 12 for a purpose to be hereinafter stated.

Figure 2:
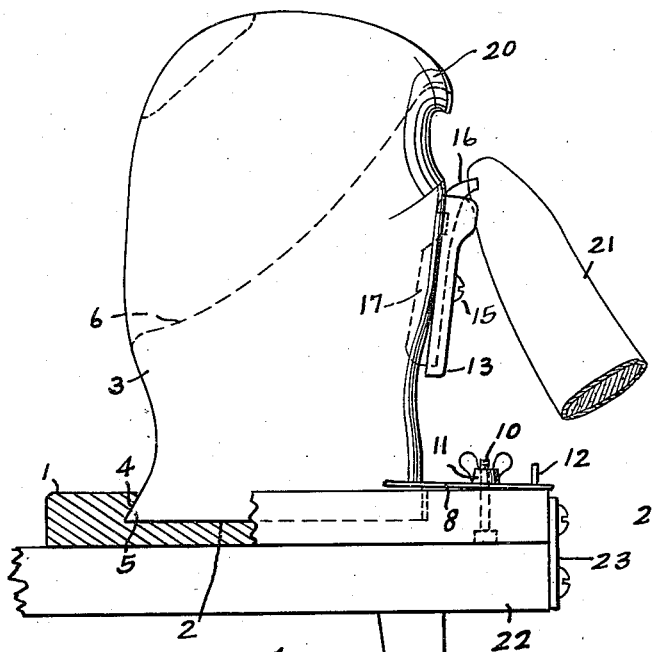
Figure 2 shows a side view partly in section.

There is a knife holder 13 at the forward side of the body and provided with a vertical slot 14. A set screw 15 is fitted through said slot 14 and screwed into one of the sections 3 of the body. There is a forwardly curved knife 16 which is extended forming a plate like guide 17. This knife and guide are seated in a vertical slot in the inner side of the holder and the guide 17 works between the body sections as shown in Figure 2. The guide 17 has a transverse notch 18, in which is seated a strap 19 which is fastened to the holder and which secures said guide and knife in place.

The upper end of the body has the forwardly extended diverging guides 20, 20, on opposite sides of the chute 6. In use a banana 21 may be grasped by the hand and moved toward the inlet end of the chute while in contact with the knife and the peeling at the advancing end of the banana will be slitted and the slitted margins will pass on opposite sides of the guides 20. As the fruit is passed through the chute 6, these guides force the peeling to separate and the peeling spreads apart and passes over the oval upper end of the body as the peeled fruit passes through the chute into a suitable receptacle provided to receive the peeled fruit. It is thus not necessary to touch the peeled fruit during the operation.

Figure 3:
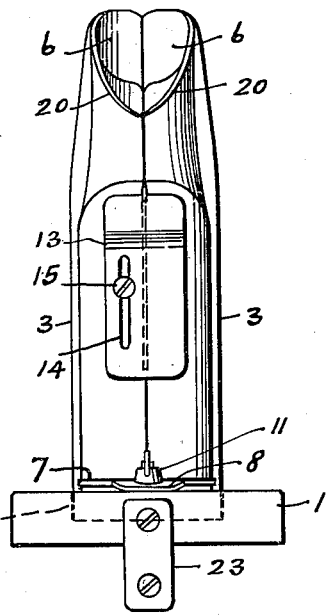
Figure 3 shows a front elevation.
Figure 4:
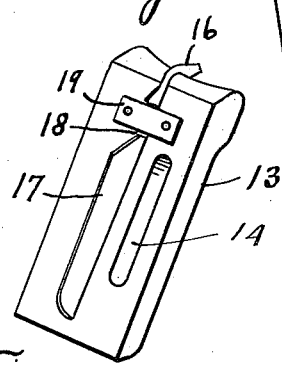
Figure 4 shows an inside perspective view of the knife holder and knife.

While in use the implement may be fastened to a table or other support 22 by means of the strap 23 as illustrated in Figures 2 and 3.

When it is desired to dismember the peeler for cleansing purposes, the nut 11 may be loosened and the plate 8 moved outwardly to clear the slot 7 and the body may then be lifted out and separated and readily cleansed.

The drawing and description disclose what is now considered to be a preferred form of the invention by way of illustration only while the broad principle of the invention will be defined by the appended claims.

What I claim is:

1. A peeler comprising a body composed of complemental sections, means for maintaining the sections in assembled relation, said body having a delivery chute between the sections, a knife holder adjustably mounted on the body, a holder guide on the holder which works between the sections, a knife on the holder arranged in advance of the chute and a divider guide between the knife and chute.

2. A banana peeler comprising a base having a seat, a body formed of complemental sections and seated in the seat, said sections having aligned slots adjacent the base, a flexible plate secured to the base and projecting into the slots and holding the body seated and holding the sections yieldingly in adjacent relation, said body having a chute between the sections, a knife on the body in advance of the inlet end of the chute and a divider between the knife and said end of the chute.

3. A banana peeler comprising a base having a seat, a body formed of complemental sections and seated in the seat and having a guideway therethrough between the sections, a flexible plate on the base and in engagement with the sections, said plate forming means for retaining the body in its seat and being effective to hold the sections yieldingly together, a knife on the body in advance of the inlet end of the guideway, and a divider arranged at the inlet end of the guideway.

ROBERT E. LEAVENS.